Fig. 2.

No. 730,882. PATENTED JUNE 16, 1903.
F. M. DAVIS.
AUTOMATIC MULTISPINDLE MACHINE.
APPLICATION FILED JULY 18, 1902.

NO MODEL. 10 SHEETS—SHEET 3.

Fig. 3.

Witnesses.
Inventor.
Frank M. Davis.
by Benedict, Morsell and Green.
Attorneys.

No. 730,882. PATENTED JUNE 16, 1903.
F. M. DAVIS.
AUTOMATIC MULTISPINDLE MACHINE.
APPLICATION FILED JULY 18, 1902.
NO MODEL. 10 SHEETS—SHEET 4.

Witnesses:
O. W. Keeney
Anna O. Faust

Inventor:
Frank M. Davis
By Benedict, Morsell and Green
Attorneys.

No. 730,882. PATENTED JUNE 16, 1903.
F. M. DAVIS.
AUTOMATIC MULTISPINDLE MACHINE.
APPLICATION FILED JULY 18, 1902.
NO MODEL. 10 SHEETS—SHEET 5.

Witnesses. Inventor.
Franklin Davis.
by Benedict, Morsell and Green.
Attorneys.

No. 730,882. PATENTED JUNE 16, 1903.
F. M. DAVIS.
AUTOMATIC MULTISPINDLE MACHINE.
APPLICATION FILED JULY 18, 1902.
NO MODEL. 10 SHEETS—SHEET 6.

Witnesses.
Inventor.
Frank M. Davis.
by Benedict, Morsell and Green.
Attorneys.

No. 730,882. PATENTED JUNE 16, 1903.
F. M. DAVIS.
AUTOMATIC MULTISPINDLE MACHINE.
APPLICATION FILED JULY 18, 1902.
NO MODEL. 10 SHEETS—SHEET 7.

Witnesses.
C. H. Keeney,
Anna V. Faust

Inventor,
Frank M. Davis.
by Benedict, Moreland Green
Attorneys.

No. 730,882. PATENTED JUNE 16, 1903.
F. M. DAVIS.
AUTOMATIC MULTISPINDLE MACHINE.
APPLICATION FILED JULY 18, 1902.
NO MODEL. 10 SHEETS—SHEET 9.

No. 730,882. PATENTED JUNE 16, 1903.
F. M. DAVIS.
AUTOMATIC MULTISPINDLE MACHINE.
APPLICATION FILED JULY 18, 1902.
NO MODEL. 10 SHEETS—SHEET 10.

Fig. 25.

No. 730,882. Patented June 16, 1903.

UNITED STATES PATENT OFFICE.

FRANK M. DAVIS, OF MILWAUKEE, WISCONSIN.

AUTOMATIC MULTISPINDLE MACHINE.

SPECIFICATION forming part of Letters Patent No. 730,882, dated June 16, 1903.

Application filed July 18, 1902. Serial No. 116,124. (No model.)

*To all whom it may concern:*

Be it known that I, FRANK M. DAVIS, residing at Milwaukee, in the county of Milwaukee and State of Wisconsin, have invented a new and useful Improvement in Automatic Multispindle Machines, of which the following is a description, reference being had to the accompanying drawings, which are a part of this specification.

This invention relates to automatic multispindle machines or devices for performing work on nuts or other comparatively small metal articles.

The object of this invention is to produce an automatic machine or device employing a plurality of work-carriers by means successively movable in a path in the device past the mouth or feeding-point thereof and a plurality of tools movable in unison with said carriers and automatically projected into and retracted from operative positions, so that the articles to be worked on may be successively fed to the device at one point, carried by said carriers through the device while work is being performed on them, and automatically ejected at the unloading-point.

A further object is to produce a device the principle of which may be utilized for performing various kinds of work and in which work may be done on a plurality of like articles at a time in which the carriers for the articles move past the mouth or feeding-point of the device successively in order that the carriers may be loaded at one point.

A more restricted and specific object of this invention is to produce a nut-facing machine automatic in its operations employing a plurality of independently-rotatable nut-holding devices successively movable past the feeding-point of the device, a plurality of facing-tools each adapted to approach and recede from the axis of rotation of one of the nuts in its travel, and means for unloading said nuts as they in their travel reach the discharging-point of the device.

These and other objects I attain in a device embodying in its make up the elements constructed, combined, and located as will be more fully set forth in the specification, illustrated in the accompanying drawings, and pointed out in the appended claims.

The device illustrated in the accompanying drawings, which represent a practical embodiment of this invention, is rigged for facing nuts which have previously been tapped and threaded.

The nuts will be fed by hand one at a time to the nut-carriers as they pass the feeding-point of the device, and the operator will insert the nuts in a receptacle or chuck on each carrier and will hold it there until the screw-nose of the rotatable spindle catches the thread of the nut and holds it within the receptacle or chuck of the nut and draws it tight to the spindle, at which time the chuck or receptacle will be locked to the spindle by the nut itself and will rotate with said spindle.

The carriage in which the spindles are mounted, which in this device are six in number, is continuously rotated, and thereby carries the spindles around and in a circular path in the device from the feeding-point to the discharging-point. A facing-tool is employed for each carrier, and the six tools move in a common plane and in unison with the carriage.

The carriers in their travel after passing the feeding-point of the device are independently and successively lowered into the plane of the tools, and each carrier remains in said plane until it approaches near to the discharging-point of the device, when it is raised therefrom, and it so remains in a raised position until it again passes the feeding-point.

Each carrier is independently rotated and has a direction of rotation when it passes the feeding-point which it keeps until it is raised from the tool plane, which is just before it passes the discharging-point. While raised from the tool plane its direction of rotation is reversed, and the nut which it carries is automatically unloaded at the discharging-point, and after the nut is unloaded its direction of rotation is reversed, and it keeps this direction until again raised from the tool plane.

In the accompanying drawings, in which like parts throughout the several views are characterized by like reference-signs.

In the drawings reference-sign 25 designates the standard of the machine, which may be of suitable material, constructed and arranged for forming a tank 26 for containing suitable liquid, beneath the surface of which the facing will be done. The standard forms a support for the various parts and mechanisms of the machine. Resting on, secured to, and projecting up from the floor of the tank is a hollow supporting-column 27, and surrounding and supported by a bearing member 28, keyed thereto, is a rotatable carriage 29. (More particularly illustrated in Fig. 25.) Suitably journaled within sleeves 30 and 31, placed for that purpose within column 27, is a main rotatable shaft 32, which at its lower end carries a gear-wheel 33, adapted to receive rotation from a drive-pulley 34 through intermediate gears 35, 36, and 37, and carried at the upper end of shaft 32 and keyed thereto is a gear-wheel 38 for rotating the spindles or nut-carriers in one direction. Keyed to shaft 32 above gear-wheel 38 is an internally-toothed gear-wheel 39 for imparting rotation to the spindles in the opposite direction from gear-wheel 38. A gear-wheel 40 is keyed to carriage 29, and a gear-wheel 41, meshing and working with gear-wheel 40, is carried on a shaft 42, journaled within suitable bearings secured to the framework of the machine. Shaft 42 receives rotation from the main shaft 32 through the medium of gear-wheels 43, 44, and 45, and thus carriage 29 is rotated.

Carriage 29, which is formed in two sections 46 and 47 suitably bolted together, is provided with six cylindrically-formed portions 48, each bored or chambered out to receive a reciprocable sleeve or spindle carrying agent or member 49, and each sleeve 49 is splined within its cylindrical portion 48. The interior of each sleeve 49 is formed to provide a bearing for a spindle 50, which is tapered at its lower end, as shown at 51, and each spindle above the sleeve is provided with an antifriction-washer 52, bearing against the top of the sleeve 49 and held in place by means of a lock-nut 53. By means of this construction when the sleeves 49 are reciprocated the spindles 50 will also be reciprocated. Yet the spindles are free to rotate within sleeves.

Figure 1:
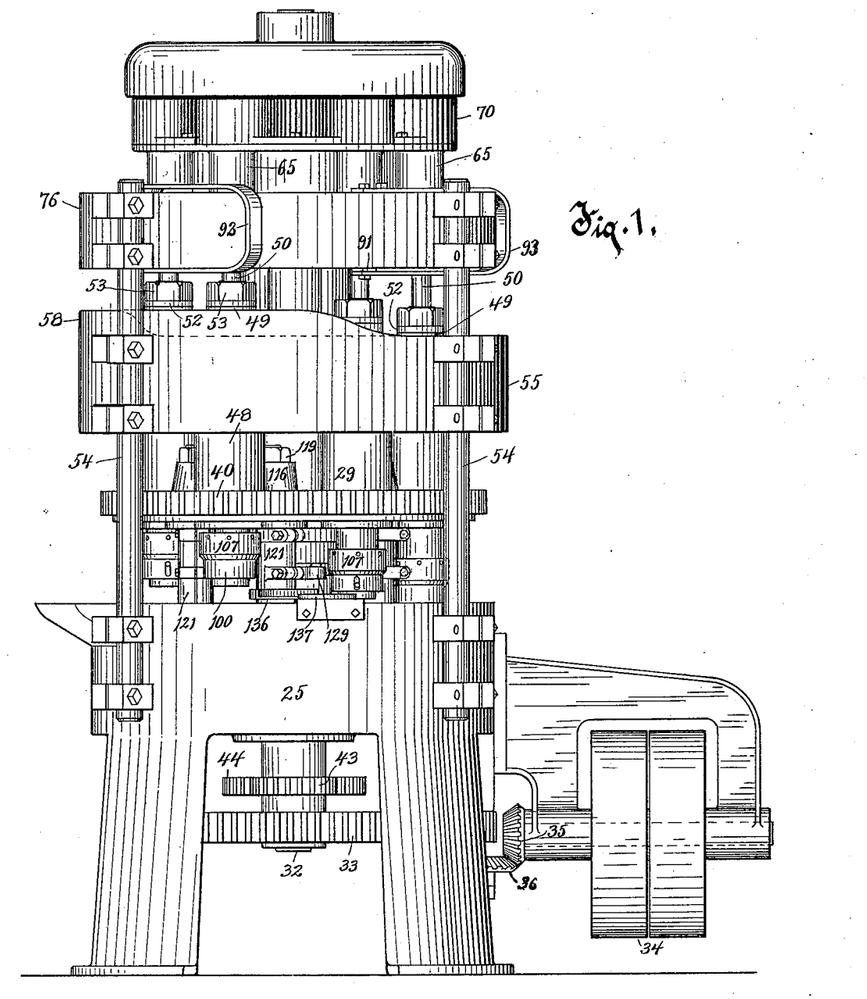
Figure 1 is a side elevation of a device embodying this invention.
Figure 2:
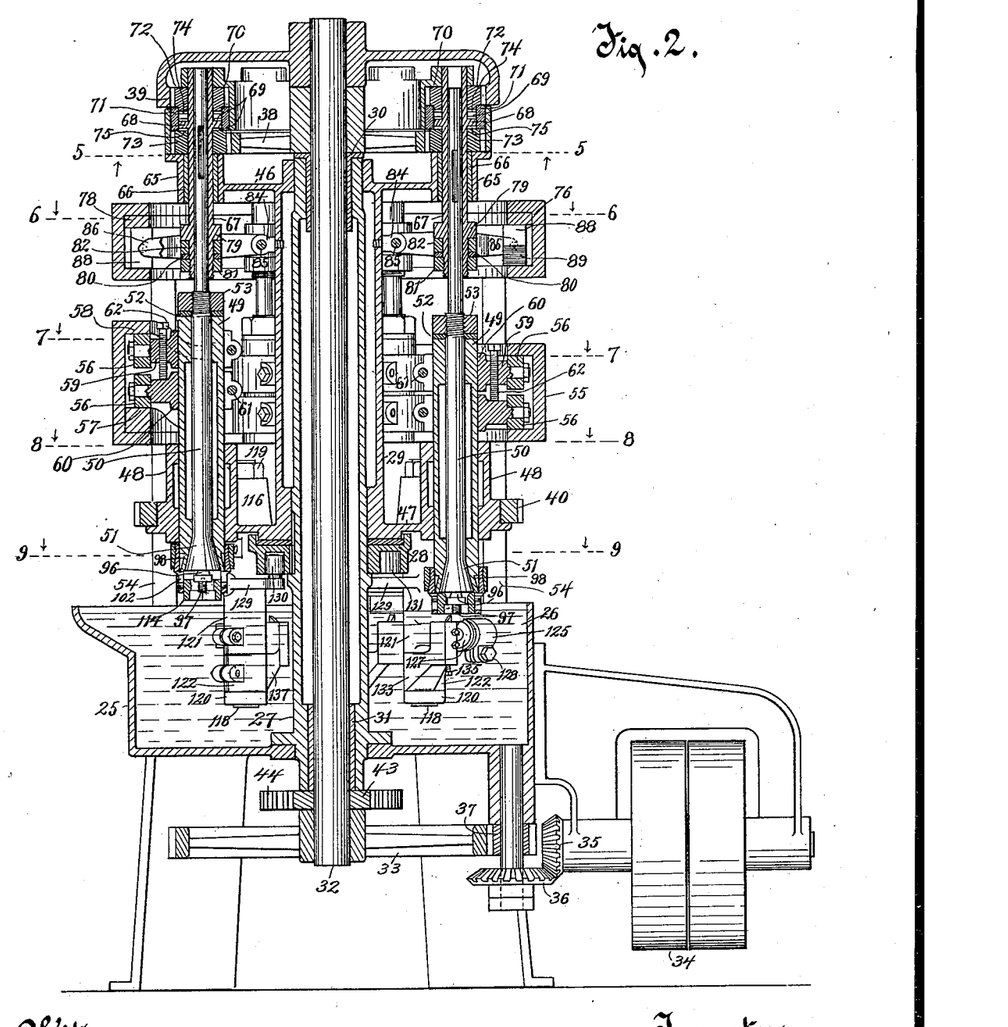
Fig. 2 is a side sectional elevation of said device.
Figure 3:
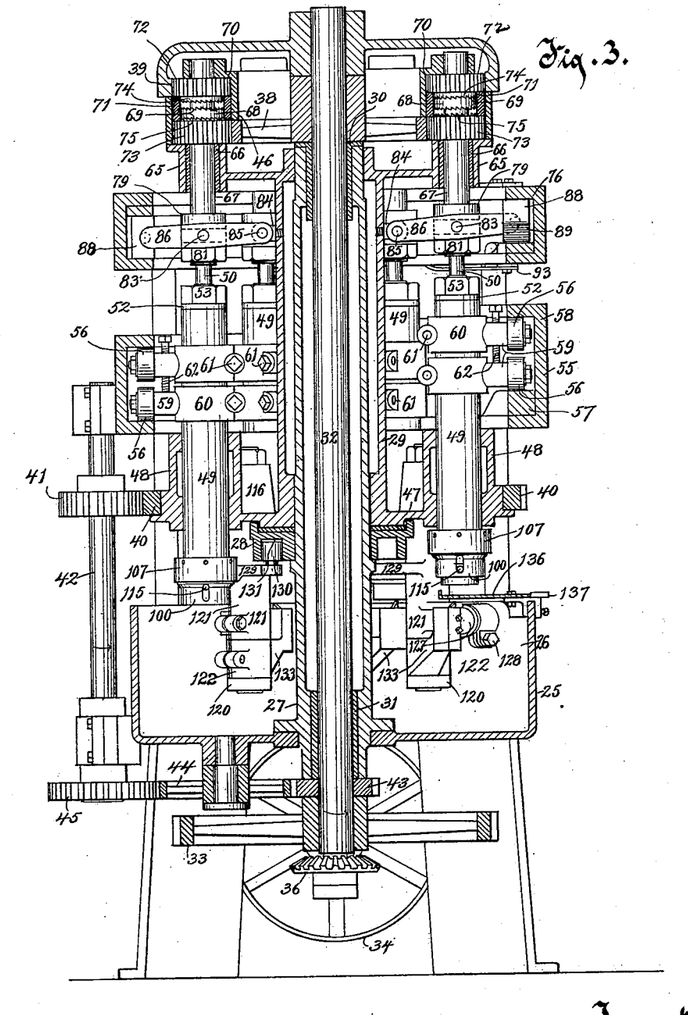
Fig. 3 is a front sectional elevation of said device.
Figure 4:
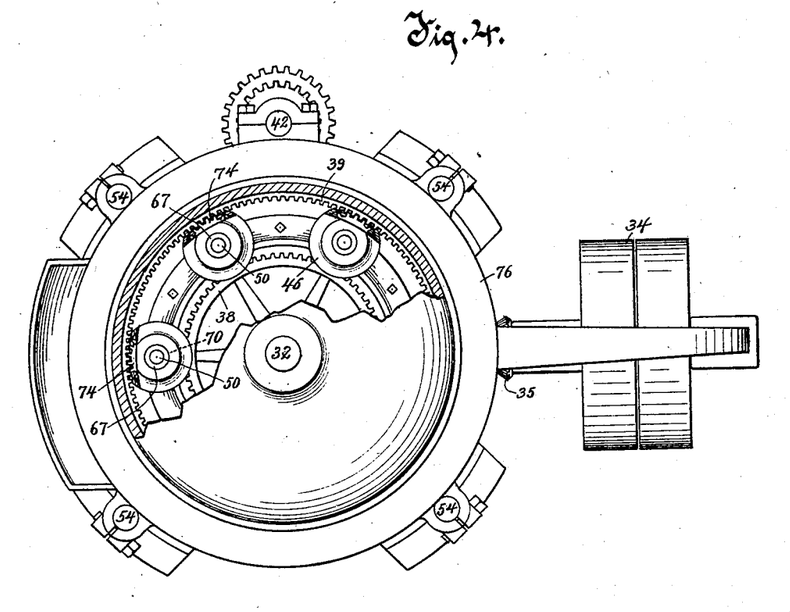
Fig. 4 is a view looking down upon the top of said device, a portion of the top of which is broken away to more clearly illustrate parts of the internal mechanisms.
Figure 5:
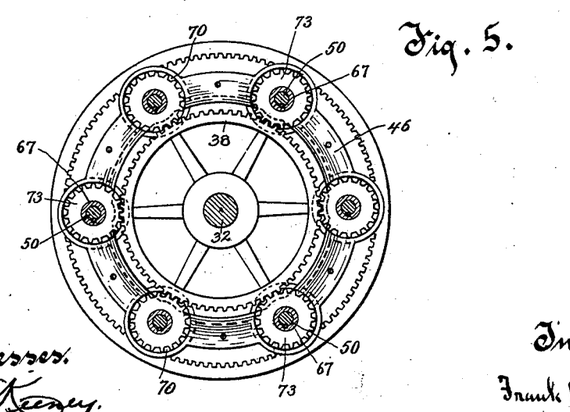
Fig. 5 is a cross-sectional view taken on line 5 5 in Fig. 2 looking in the direction of the arrows.
Figure 7:
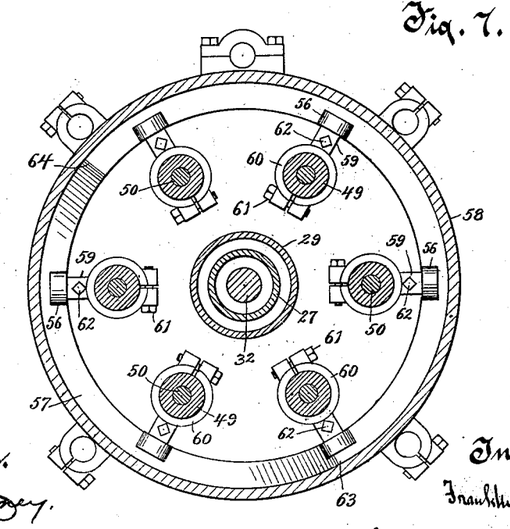
Fig. 7 is a cross-sectional view taken on line 7 7 in Fig. 2 looking in the direction of the arrows. This view illustrates the mechanisms for successively and independently reciprocating the spindles at the proper points in their travel through the device.
Figures 8, 9, 24:
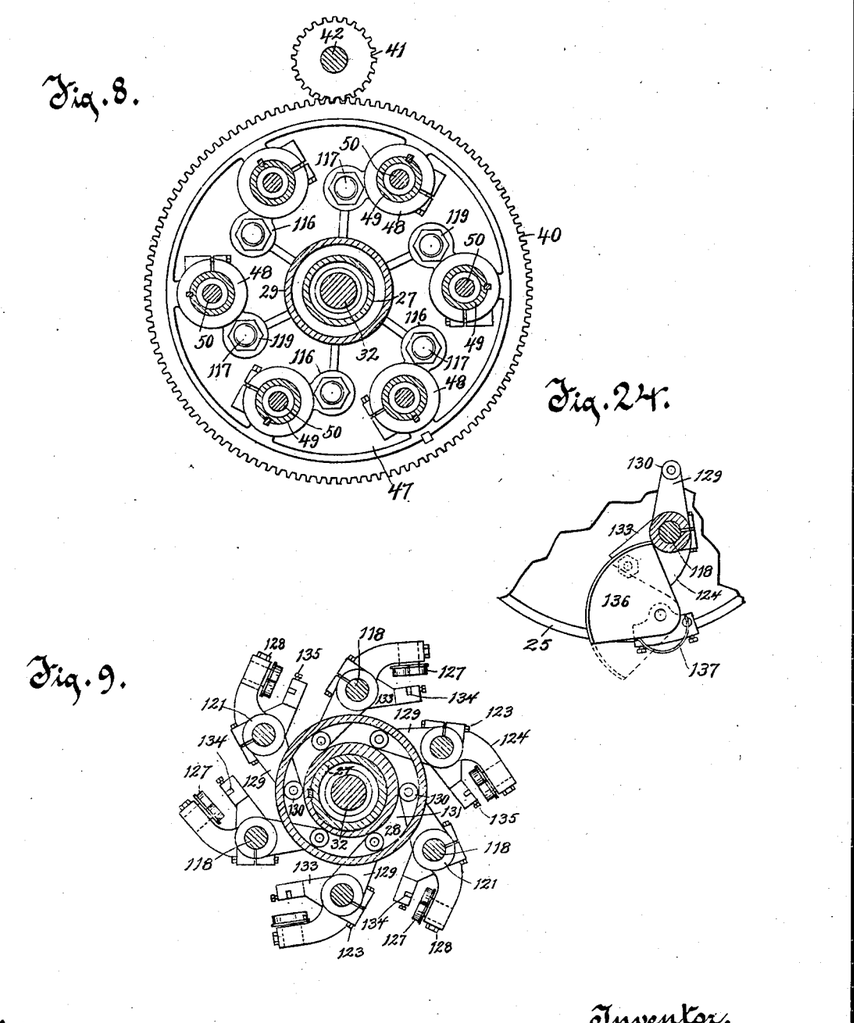
Fig. 8 is a cross-sectional view taken on line 8 8 in Fig. 2 and, among other things, shows the gear-wheels for rotating the carriage of the device.
Fig. 9 is a cross-sectional view taken on line 9 9 in Fig. 2, and this view illustrates the tool-holders and the means by which each tool is projected into and retracted from operative position.
Fig. 24 is a plan view of the mechanism for catching and ejecting the nuts from the device as they are unloaded from the nut-carriers upon reaching the discharging-point of the device.

Securely held in place by means of rods 54, secured thereto and to the base or standard of the machine, is a cammed roller-way 55, by means of which the sleeves 49 and the spindles 50 will be reciprocated at the proper time. The cammed roller-way 55 is formed in the nature of a hollow ring, against the upper and lower inner walls of which rollers 56 are adapted to bear and ride. The roller-way 55 is formed with two riding planes, and the floor or inner wall, for the sake of convenience in manufacture, is formed in one plane, and an auxiliary piece 57 is inserted within the housing to form the highest plane of the roller-way. The upper and lower walls of the roller-way are parallel, and to accommodate the raised portion 57 the upper wall is formed with an offset or raised portion 58. (Clearly shown in Figs. 2 and 3.) Two rollers 56 for each spindle, one adapted to bear against the upper wall of the roller-way and one against the lower wall of the roller-way, are carried by two arms 59. Each arm 59 is formed with an annular split portion 60, Fig. 7, surrounding sleeve 49 and secured to said sleeve by means of a clamping-bolt 61. Extending through the upper arm 59 of each pair carried by the sleeves is an adjusting-screw 62, threaded through said arm and bearing against the top of the arm 59 below it. By means of these screws the proper distances between the arms of each pair may be obtained, so that the rollers will suitably contact with the upper and lower walls of the roller-way 55. The raised portion of the roller-way 55 extends from the point 63 to the point 64 in Fig. 7, and when the rollers are traveling on the raised portion of the roller-way between the points 63 and 64 the spindles will be raised from the tool plane.

Figure 25:
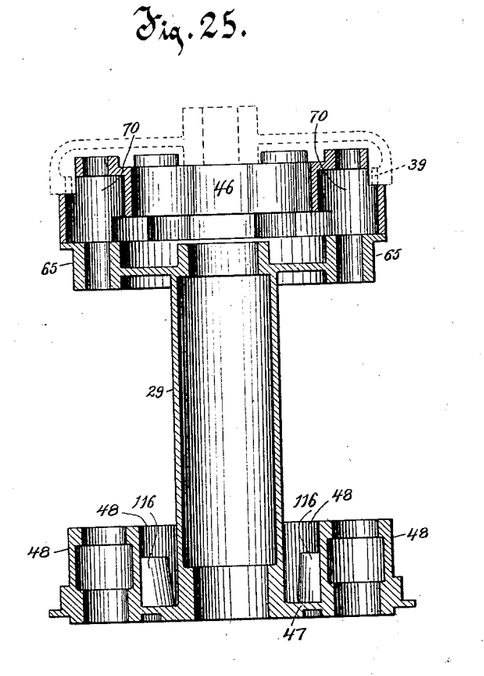
Fig. 25 is a sectional view in side elevation of the movable carriage.

The upper portion of the carriage 29 is provided with hollow cylindrically-formed bearing and guiding portions 65, each in line with one of the lower cylindrical portions 48. As the carriage will preferably be formed of iron or steel, each of the cylindrical portions 65 is provided with an antifriction metallic bushing 66. Surrounding and splined to the upper portion of each spindle 50 is a sleeve-like member 67, lying within bushing 66. Each sleeve 67 is provided with an annular flanged portion 68, having teeth 69 formed around its upper and lower faces. Within each cylindrically-formed housing or portion 70 of the upper part of the carriage, as shown in Fig. 25, loosely surrounding sleeve 67 and held apart from one another by a separating-ring 71, are two gear-wheels 72 and 73. The gear-wheels 72 are located above the toothed flanges 68 and are formed with teeth 74, adapted to coact with the upper teeth 69 of the flanged portions when said flanged portions are raised in contact therewith. Gear-wheels 73 are located below flanged portions 68 and in their upper faces are provided with teeth 75, adapted to coact with the teeth on the under side of flanged portions 68 when the flanged portions are lowered in contact therewith.

Secured and carried by upward extensions of rods 54 is a cammed way 76, by means of which the sleeves 67 will be shifted longitudinally of the spindles 50 to receive rotation from one or the other of gears 72 and 73 at the proper time in the travel of said carriage. The cammed way 76 is formed in the nature of a ring having upper and lower inwardly-projecting flanges and is illustrated in detail in Fig. 16. The cammed or offset portions of the way 76 are formed by riding-plates 77 and 78, secured within the cammed way 76.

Figure 6:
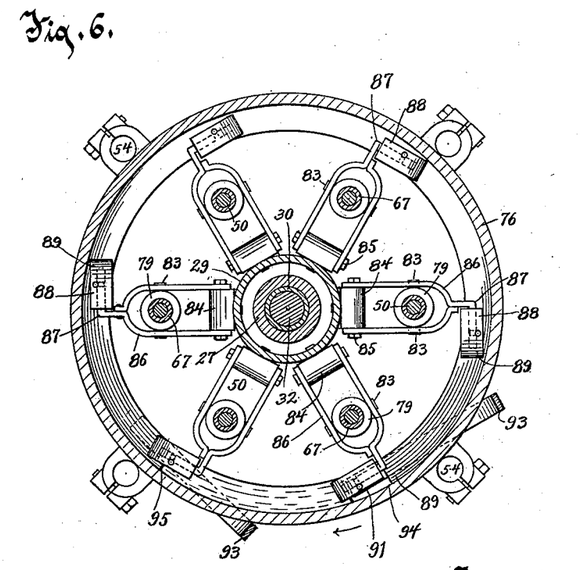
Fig. 6 is a cross-sectional view taken on line 6 6 in Fig. 2 looking in the direction of the arrows. This view illustrates the mechanism for actuating the clutches for changing the direction of rotation of the spindles at the proper points in relation to their travel around or through the device.

Each sleeve 67 surrounding the upper portion of the spindle is provided with a shoulder 79, and confined below each shoulder 79, by means of a washer 80 and a lock-nut 81, which is threaded to the lower end of said sleeve 67, is an annular collar 82, from which two oppositely-positioned stud-pins 83 project. (See Fig. 6.) Between each spindle and the central sleeve-like portion of the carriage and screwed to said central sleeve-like portion is a fulcrum-block 84, through which a stud-bolt 85 passes. Mounted on said bolt 85 as a fulcrum and engaging stud-pins 83 are the furcate parts of a bifurcated lever 86. The outer end 87 of one of the furcate parts of the lever 86 is bent at right angles, as shown in Fig. 6, and loosely mounted upon said bent-over end is a shoe 88, which is adapted to ride and bear against the cammed way 76.

Figure 16:
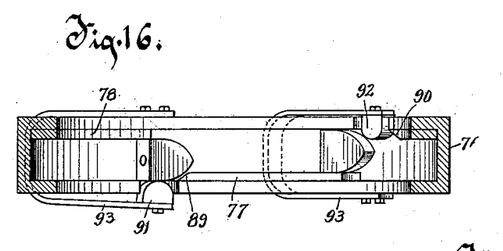
Fig. 16 is a sectional view in detail of a portion of the mechanism for operating the clutches for imparting rotation to the spindles in the proper direction, according to their position in their travel through the device.
Figure 17:
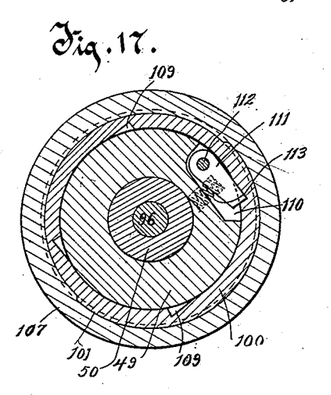
Fig. 17 is a cross-sectional view taken on line 15 15 in Fig. 12 looking in the direction of the arrow, and this view illustrates the mechanism associated with each spindle for locking the nut-chucks against rotation with the spindle at the proper point in the travel of said spindle or as it approaches the discharging-point of the device.

The forward ends of the plates 77 and 78 of the camway 76 or the ends which the shoes 88 in their travel around said way approach are beveled, as shown in Fig. 16, at 89 and 90, and the forward end of each shoe is preferably curved or rounded, as shown in Fig. 16, so as to easily rise up over the beveled ends of the plates. The adjacent ends of the plates 77 and 78 stand a distance apart, as shown in Fig. 16, and said distance will preferably about equal two-thirds of the length of the shoes, so that as the shoe starts to ride over the beveled end of one plate its rear end will abruptly pass off the end of the plate which it has just left, and in order to secure the quick movement of the shoes from one plane of travel to the other spring-actuated forcing members 91 and 92 are employed. These forcing members 91 and 92 project through openings therefor formed in the top and bottom of the cammed way, and said members are forced into the camway by means of U-shaped springs 93, which are secured to the outside of the camway on opposite sides from the openings. By the means just described when the spindles reach the point 94, (see Fig. 6,) which point is just as the spindles approach the discharge-point of the device, the flanged portions 68 of the sleeve 67 will be raised, so that the spindles will receive rotation from the upper gears 72, and this direction of rotation will be kept until a point 95 is reached, which is just before the spindle reaches the feeding-point of the device. Between the points 94 and 95 each spindle in its travel will discharge the nut it carries by means of mechanism hereinafter described.

The upper gear-wheels 72 are adapted to mesh and work with the internally-toothed gear-wheel 39, while the gear-wheels 73 are adapted to mesh and work with gear-wheel 38, and it will thus be seen that gear-wheels 72 and 73 will be driven in opposite directions.

Figure 12:
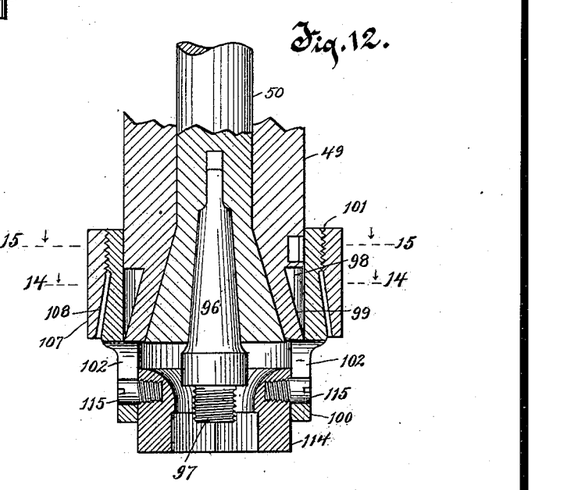
Fig. 12 is a sectional elevation of said chuck illustrated in Fig. 11, showing the nut removed.
Figure 13:
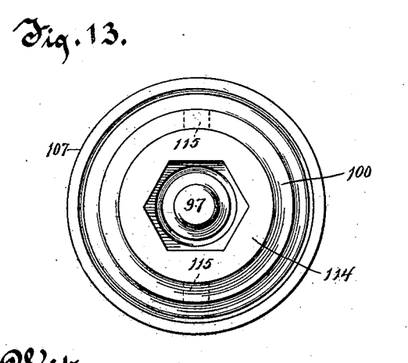
Fig. 13 is a view looking up toward the bottom of the chuck shown in Fig. 11 with the nut removed.
Figure 14:
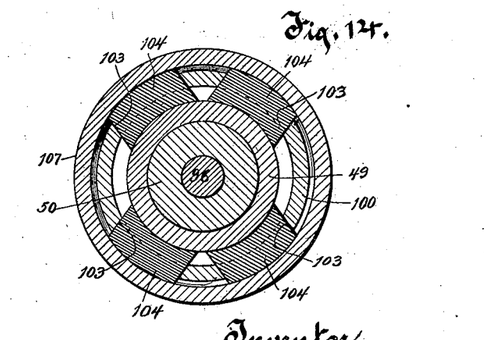
Fig. 14 is a cross-sectional view taken on line 14 14 in Fig. 12 looking in the direction of the arrows.
Figure 15:
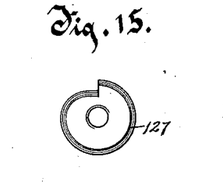
Fig. 15 is an end elevation of one of the facing-tools.
Figure 18:
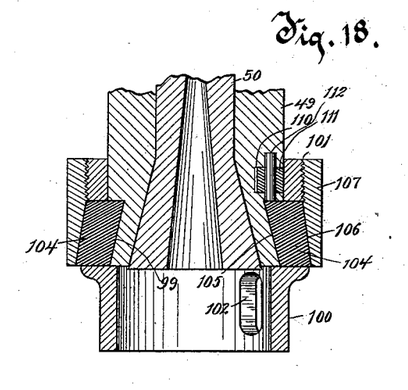
Fig. 18 is a sectional elevation of portions of one chuck and spindle.

The lower end of each spindle 50 is drilled and tapered out interiorly, as shown in Figs. 12 and 18, to receive a tapered mandrel 96, of any of the well-known types, provided with a screw-nose 97. Each of the spindle-sleeves 49 near its lower end is cut away, as shown at 98 in Fig. 12, and provided with a beveled face 99 concentric to the axis of the spindle and tapered toward the top of the spindle. A clutch member 100, formed in the nature of a sleeve, exteriorly threaded, as at 101, and provided with two elongated slots 102 is also provided with four rectangular openings or slots 103, extending through its shell. Located within each slot 103 is a fiber block 104, and each block is provided with a slanting concave face 105, adapted to bear against the tapered face 99 of the cut-away portion of the sleeve 49. Each fiber block is also provided with a slanting convex face 106, and a retainer-ring 107, threaded to the member carrying the fiber blocks, is provided with a tapered or beveled face 108, adapted to bear against the convex faces of the fiber blocks. It will be seen that the friction exerted by the fiber blocks against the face 99 of the sleeve 49 may be varied by varying the position of the retainer-ring—that is, by moving the retainer-ring down the friction between the face 99 and the concave faces of the fiber blocks will be increased, and by moving said retainer-ring upward the friction will be reduced, as by these different movements the pressures will be varied.

The inner face of member 100, which carries the friction-blocks, is provided with notches 109, preferably four in number, and located within a recess 110 therefor in the sleeve 49 is a spring-actuated dog 111, yieldingly swung in an outward position on its pivot 112 by a spring 113. This spring-actuated dog, with the coöperating notches, will lock the member 100 against rotation in one direction, while the friction-blocks thus tend to hold said member against rotation in the other direction, but will allow it to rotate when sufficient force is exerted to overcome the friction formed by the blocks. Located within the lower portion of member 100 and slidable longitudinally therein is a nut receptacle or vise 114, the internal shape of which will correspond to the shape of the nuts being worked on, and this nut-receptacle is locked to said friction-block-carrying member against rotation therewith by means of two screws 115, which extend through slots 102 and into the nut-receptacle. It will be seen that when a nut is inserted within the mouth of the receptacle 114, supposing the spindle to be rotated to the left, the thread on the screw-nose mandrel 96 will catch the thread of the nut, and as the receptacle 114 can move longitudinally within member 100 and the nut being held against rotation by means of the friction-blocks it will be drawn on the threads of the screw-nosed mandrel until it is fast against the abutment thereof, and when so locked fast it will cause the receptacle 114 and the member 100 to be rotated with the spindle until the spindle is reversed in its direction of rotation, at which time the spring-actuated dog 111 will come into play and lock the nut-receptacle against rotation in the opposite direction, and the nut being held against rotation it will be unscrewed from the mandrel. In this manner the rotation of each spindle as it approaches the discharging-point of the device being reversed the nut is unscrewed thereby and automatically unloaded from the spindles.

Figure 22:
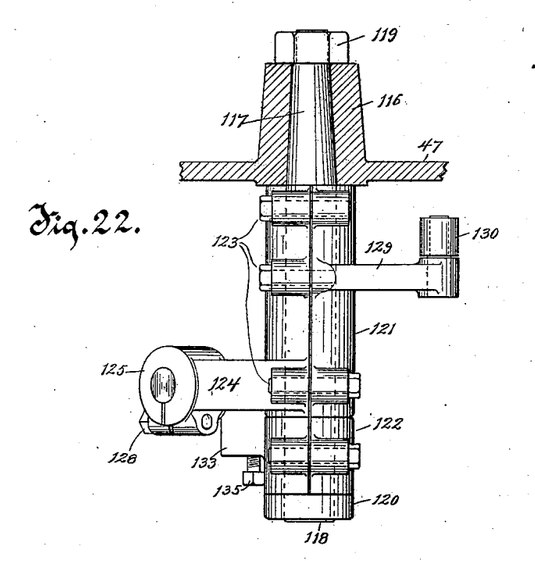
Fig. 22 is a view in elevation of one of the tool-holders secured to a portion of the movable carriage.
Figure 23:
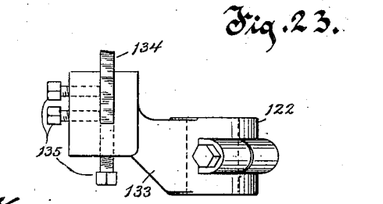
Fig. 23 is a front view in elevation of one of the holders for carrying one of the chamfering-tools. A tool is shown mounted in said holder.

Between each of the cylindrical portions 48 the floor of the carriage, Fig. 25, is provided with an upwardly-extending lug 116, (see Fig. 22,) which is centrally drilled and tapered to receive the tapered end 117 of a downwardly-extending non-rotatable spindle 118, locked in place by means of a nut 119, threaded to its upper end.

A set-collar 120 is screwed to each spindle 118 at its lower end, and between the set-collar and the floor of the carriage two sleeves 121 and 122 are located on spindle 118. Each of said sleeves acts as a support or tool-carrying agent. Sleeve 121, which is split from end to end and is adjusted on spindle 118 by means of adjustment-screws 123, is provided with a tool-carrying arm 124, which at its outer end is formed in the nature of a split hollow cylindrical clamp 125, and within the bore of said clamp 125 the spindle or shank 126 of a tool 127 is clamped and bound by means of a screw 128. The tool shown is of a well-known type of circular cutting-tool.

Figure 19:
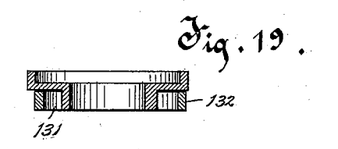
Fig. 19 is a sectional view illustrating a modified form of camway for governing the movements of the tools into and out of operative position.
Figure 20:
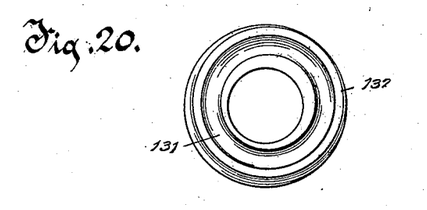
Fig. 20 is a face view of said modification shown in Fig. 19.
Figure 21:
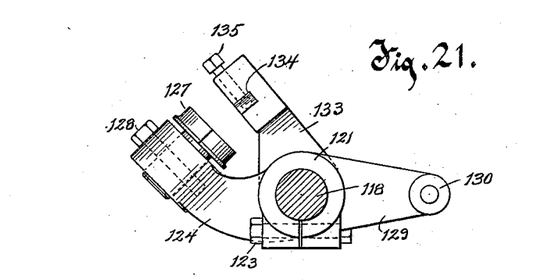
Fig. 21 is a plan view of one of the holders with a tool mounted therein.

The sleeve 121 will be adjusted on spindle 118, so that said sleeve may be turned or partially rotated, and the sleeve is provided with another projecting arm 129, carrying a vertically-disposed roller 130 at its outer end. The under face of bearing member 28 is formed with a channel or groove 131 eccentric to the axis of rotation of the rotatable carriage, and within this channel and bearing against one side thereof rollers 130 lie. From this it will be seen that as the carriage is rotated the tool-carrying agents, which are mounted on the carriage, are moved so that each tool will approach and recede from the axis of rotation of one of the nut-carrying spindles. In Figs. 19 and 20 a modified form of this eccentric channel is illustrated, and in these views the outer wall of the channel is shown formed of a separate ring 132 from the other portion of the bearing member. When this form is used, the rollers 130 can snugly fit the channel, as the ring will be rotated by the rollers. The eccentricity of the roller channel or cam will be such that the tools when properly positioned will move from the outside across the face of the nut to be machined, or rather from the outside to the threaded opening of the nut.

Figure 10:
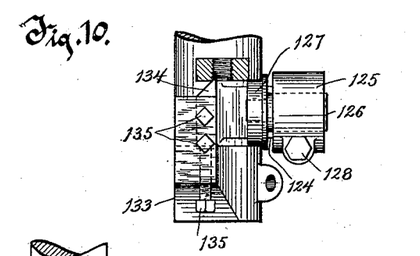
Fig. 10 is a view in elevation of one of the tool-holders and is taken looking in the direction of the arrow in Fig. 21. In this view a nut is shown in the position in which it appears when the facing-tool begins its work.
Figure 11:
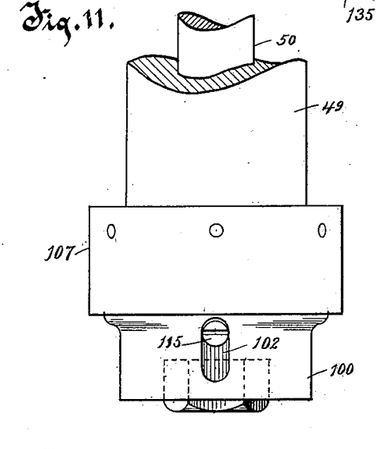
Fig. 11 is a view in elevation of one of the chucks associated with each spindle and shows a nut in place in the receptacle of the chuck.

Sleeve 122, carried by spindle 118, is non-rotatable upon said spindle and is provided with a tool-carrying arm 133, and a chamfering-tool 134 is secured to said arm by means of screws 135. This chamfering-tool will be adjusted so that when the nut is lowered it will occupy a position relative to the chamfering-tool, as shown in Fig. 10, or so that as it reaches the tool plane of the device it will be suitably chamfered out by said tool.

Secured to the tank 26, at the discharge-point of the device by suitable means, is a swinging tray 136, upon which the nuts as they are discharged from the spindles will fall. The tray is yieldingly forced into the device and under the spindles by means of a suitable spring 137. The tray when in its inward position will lie in the path of the lugs 116 on the carriage and by them as they move past the discharge-point of the device will be swung outward against the stress of spring 137. The nuts falling on the tray will work around the edge thereof and off by the spring action of the tray itself.

For different-sized nuts different-sized nut-receptacles and screw-nosed mandrels may be employed.

It will be understood that for different kinds of articles—such as nuts, bolts, or screws—different kinds of chucks for holding the same to the spindles may be utilized. So, also, different styles of tools may be used.

It is obvious that many variations and changes in the details of construction would readily suggest themselves to persons skilled in the art and still fall within the spirit and scope of this invention, and many of the features shown and described may be omitted or used either alone or in association with others. The invention therefore is not limited or restricted to the exact details of construction and arrangements shown and above set forth; but, Having now set forth the object of the invention and a form of construction embodying the principle thereof and having described such construction, the function, and mode of operation, what is claimed as new and useful, and sought to be secured by Letters Patent, is—

1. In a device of the character described, a plurality of rotatable and reciprocable work-carrying spindles, a camway common to all of said spindles, means associated with each spindle and bearing on said way for successively reciprocating said spindles, a plurality of cutting-tools, stationary means for guiding each of said tools, and means for moving said tools so guided into and out of operative position with relation to said work-carrying spindles.

2. In a device of the character described, a plurality of rotatable and reciprocable work-carrying agents, means for alternately reciprocating said agents, a plurality of cutting-tools, stationary means for guiding said tools, and means for moving said tools so guided into and out of operative position with relation to said work-carrying agents.

3. In a device of the character described, a plurality of rotatable and reciprocable spindles, a work-mandrel carried by each spindle, a chuck for each spindle, means for alternately reciprocating said spindles, a plurality of cutting-tools, stationary means for guiding said tools, and means for moving said tools so guided into and out of operative position with relation to said spindles.

4. In a device of the character described, a plurality of rotatable and reciprocable spindles, a work-mandrel carried by each spindle, a chuck for each spindle, means for alternately reciprocating said spindles, a plurality of cutting-tools, means for moving said tools into and out of operative position while operating on the work, stationary means for determining the movements of said tools, and means after each tool has moved from operative position for automatically discharging the work operated on by it.

5. In a device of the character described, a plurality of rotatable and reciprocable work-carrying spindles, means for automatically accomplishing the successive reciprocation of said spindles, a movable carrier for successively moving said spindles past the feeding-point or mouth of the device, a plurality of cutting-tools each movable toward and away from the path of reciprocation of one of said spindles, and stationary means for guiding each of said tools whereby it is caused to move toward and away from said path.

6. In a device of the character described, a plurality of rotatable and reciprocable work-carrying spindles, means for automatically accomplishing the successive reciprocation of said spindles, a movable carrier for successively moving said spindles past the feeding-point or mouth of the device, a plurality of cutting-tools carried by said carrier, and means for automatically moving said tools into and out of operative position with relation to said work-carrying spindles.

7. In a device of the character described, a plurality of rotatable and reciprocable spindles, a work-carrying chuck for each spindle locked to said spindle by said work, means for automatically accomplishing the successive reciprocation of said spindles, a movable carrier for successively moving said spindles past the feeding-point or mouth of the device, a plurality of cutting-tools, means for automatically moving said cutting-tools into and out of operative position, and mechanism for successively reversing the direction of rotation of said spindles as they approach the discharge-point of the device for causing said chucks to discharge the work therefrom.

8. In a device of the character described, a plurality of rotatable and reciprocable spindles, a work-carrying mandrel for each spindle, a chuck for each spindle coacting and rotatable with said spindles upon the securing of the work upon the mandrels, means for successively and continuously moving said spindles in a path in the device leading past the feeding-point or mouth thereof, a plurality of tools, means for automatically moving said tools into and out of operative position, and means for automatically unloading each of said mandrels of its work as it approaches the discharge-point of the device.

9. In a device of the character described, a plurality of rotatable and successively-reciprocable carrying-spindles, means for successively moving said spindles in a path in the device leading past the feeding-point or mouth thereof, a plurality of tool-supporters movable in unison with said spindles in their travel around said path, a tool carried by each supporter, means for moving said tools into and out of operative position, and means for changing the direction of rotation of each of said spindles in its travel around said path.

10. In a device of the character described, a continuously-moving carriage, a plurality of rotatable and successively-reciprocable work-carrying agents mounted on said carriage, a screw-nosed mandrel carried by each of said agents, a chuck associated with each mandrel for holding the work to be operated on against rotation until screwed to the mandrels, a plurality of tools movable in a common plane toward and away from the axes of rotation of said mandrels, means for reversing the direction of rotation of each of said work-carrying agents, and mechanism for preventing the rotation of said chucks when the direction of rotation of said agents is changed, whereby said mandrels are automatically unloaded.

11. In a device of the character described, a reciprocally-mounted rotatable spindle, means for rotating said spindle in either direction, a screw-nosed mandrel carried by said spindle, a chuck associated with said spindle for automatically holding the nut placed on said mandrel against rotation until secured thereto, a cutting-tool automatically movable toward and away from the axis of rotation of said spindle and means for projecting the work carried by said mandrel into and retracting it from the plane of movement of said tool.

12. In a device of the character described, a continuously-moving carriage, a plurality of rotatable and successively-reciprocable work-carriers mounted in said carriage, means for operating said work-carriers, a plurality of tool-supporting agents carried by said carriage, a tool carried by each supporting agent, means for moving said tools into and out of operative position with relation to said work-carriers, and means for moving said carriage.

13. In a device of the character described, a continuously-movable carriage, a plurality of rotatable and successively-reciprocable work-carriers mounted in said carriage, a plurality of tool-carrying agents carried by said carriage, a tool carried by each agent, a cam for moving said tools into and out of operative position with relation to said work-carriers, and means for driving said carriage.

14. In a device of the character described, a movable carriage, a plurality of rotatable and successively-reciprocable work-carriers mounted in said carriage, and a plurality of tool-supporting agents carried by said carriage and each automatically movable into and out of operative position with relation to said work-carriers.

15. In a device of the character described, a rotatable carriage, means for moving said carriage, a plurality of rotatable and successively-reciprocable work-carriers mounted in said carriage, means for reversing the direction of rotation of said work-carriers once in every revolution of said carriage for gripping and releasing the work carried thereby, a plurality of tool-supporting agents rotatable in unison with said carriage, a tool carried by each agent, and means common to all of said agents for moving said tools into and out of operative position with relation to said work-carriers.

16. In a device of the character described, a rotatable carriage, a plurality of reciprocable sleeves mounted in said carriage, means for successively reciprocating said sleeves, a rotatable work-carrying spindle carried within each sleeve, a clutch rotatable with each spindle and longitudinally movable thereon, two gear-wheels loosely surrounding each spindle one on either side of said clutch, means for rotating said gear-wheels in opposite directions, means for automatically moving said clutch longitudinally of said spindle for engaging either one of said gear-wheels to rotate said spindle with it, a plurality of tool-supporters rotatable in unison with said carriage, a tool carried by each supporter, and means for moving said tools into and out of operative position with relation to said work-carrying spindles.

17. In a device of the character described, a rotatable carriage, a plurality of successively-reciprocable carriers, a rotatable work-carrying spindle mounted in each carrier and reciprocable therewith, a plurality of cutting-tools, means for moving each of said tools into and out of operative position with relation to said work-carrying spindles, rollers carried by each reciprocable carrier, a stationary camway for said rollers, and means for moving said carriage.

18. In a device of the character described, a plurality of successively-reciprocable carriers, a rotatable work-carrying spindle mounted in each carrier and reciprocable therewith, means for reciprocating said carriers, a plurality of cutting-tools, and a cam for guiding said tools into and out of operative position with relation to said work-carrying spindles.

19. In a device of the character described, a plurality of reciprocable carriers, a spindle rotatable within each carrier, means for successively moving said carriers past the feeding-point or mouth of the device, a work-holding chuck for each spindle carried by said carriers, means for successively reciprocating said carriers, a plurality of cutting-tools, means for moving said tools into and out of cutting position, and means for automatically unloading each chuck as it approaches the discharging-point of the device.

20. In a device of the character described, a continuously-moving carriage, a plurality of rotatable and successively-reciprocable spindles mounted in each carriage, a work-holding device for each spindle, means for reciprocating said spindles, a plurality of tool-supporting agents movable in unison with said carriage, a tool supported by each agent movable into and out of working position, and mechanism for reversing the direction of rotation of each spindle at a certain point in the travel of said carriage to cause said work-holding devices to release work carried thereby.

21. In a device of the character described, a plurality of rotatable work-carrying agents successively movable past the mouth or feeding-point of the device, an automatic chuck carried by each agent, a plurality of tools movable in unison with said agent past said feeding-point, means for bringing the work and tools in contact, means, as the work carried by each agent approaches the discharge-point of the device, for moving said work and the tool which has operated on it apart, and mechanism, after the work carried by each agent and the tool which has operated on it have been separated, for automatically discharging said work from the agent which carried it.

22. In a device of the character described, a rotatable carriage, a plurality of rotatable work-carrying agents mounted in said carriage and by it successively movable past the feeding-point or mouth of the device, a plurality of tools movable in unison with said carriage, means for bringing the work and tools in contact, a cam, as the work carried by each agent approaches the discharging-point of the device, for moving said work and the tool which has operated on it apart, and mechanism, after the work carried by each agent and the tool which has operated on it have been separated for automatically discharging said work from the agent which carried it.

23. In a device of the character described, a rotatable carriage, a plurality of rotatable work-carrying agents mounted in said carriage and by it successively movable past the feeding-point or mouth of the device, a plurality of tools movable in unison with said carriage, means for bringing the work and tools in contact, means as the work carried by each agent approaches the discharge-point of the device for moving said work and the tool which has operated on it apart, and mechanism, after said separation is effected for automatically discharging said work from the agent which carried it.

24. In a device of the character described, a plurality of rotatable and reciprocable spindles, a work-mandrel carried by each spindle, a chuck for each spindle, means for locking said chuck to and unlocking it from said spindle, means for alternately reciprocating said spindles, a plurality of cutting-tools, and means for causing said tools to approach and recede from the axes of rotation of said spindles.

25. In a device of the character described, a plurality of rotatable and reciprocable spindles, means for automatically accomplishing the successive reciprocation of said spindles, a movable carrier for successively moving said spindles past the feeding-point or mouth of the device, a plurality of pivotally-mounted cutting-tools, and stationary means for guiding each of said tools whereby it is caused to approach and recede from the axis of rotation of one of said spindles synchronously with the movement of said carrier.

26. In a device of the character described, a plurality of rotatable and reciprocable spindles, means for automatically accomplishing the successive reciprocation of said spindles, a movable carrier for successively moving said spindles past the feeding-point or mouth of the device, a plurality of pivotally-mounted tools, and stationary means for guiding said tools whereby they are caused to approach and recede from the paths of reciprocation of said spindles synchronously with the movement of said carrier.

27. In a device of the character described, a plurality of rotatable and reciprocable spindles, a chuck for each spindle, means for automatically accomplishing the successive reciprocation of said spindles, a movable carrier for successively moving said spindles past the feeding-point or mouth of the device, a plurality of pivotally-mounted cutting-tools, and stationary means for guiding said tools whereby they are caused to approach and recede from the paths of reciprocation of said spindles.

28. In a device of the character described, a plurality of rotatable and reciprocable spindles, a chuck for each spindle, means for automatically accomplishing the successive reciprocation of said spindles, a movable carrier for successively moving said spindles past the feeding-point or mouth of the device, a plurality of pivotally-mounted cutting-tools, and stationary means for guiding said tools whereby they are caused to approach and recede from the paths of reciprocation of said spindles synchronously with the movement of said carrier.

29. In a device of the character described, a plurality of rotatable work-carriers, means for successively moving said carriers past the feeding-point or mouth of the device, a plurality of pivotally-mounted tool-supporting agents, tools carried by said agents, and stationary means for guiding said tools whereby they are caused to approach and recede from the axes of rotation of said work-carriers.

30. In a device of the character described, a plurality of work-carrying agents, instrumentalities for automatically securing the work inserted at the mouth or feeding-point of the device to said agents, means for conveying said agents past the feeding and discharging points of the device, a plurality of tools, a means for moving said tools into the path of travel of said agents, and means for unloading the agents of the work carried by them as they approach the discharge-point of the device.

31. In a nut-facing machine, rotatable agents for conveying a plurality of nuts successively through the machine, pivotally-mounted facing-tools and stationary means for causing said tools to operate on said nuts in their passage.

32. In a nut-facing machine, rotatable agents for conveying a plurality of nuts successively through the machine, a plurality of facing-tools movable synchronously with said agents and across the portions of the nuts to be faced, and a device associated with said agents for automatically unloading each agent of the nut carried by it as it approaches the discharging-point of the machine.

33. In a device of the character described, a rotatable carriage, a plurality of work-holders mounted in said carriage, means for alternately reciprocating said work-holders, means for independently rotating said work-holders in either direction, a plurality of cutting-tools pivotally mounted in said carriage and means for causing each of said tools to approach and recede from the path of reciprocation of one of said work-holders.

34. In a nut-facing machine, a plurality of nut-mandrels, a pair of oppositely-rotatable gears associated with each mandrel, devices for transmitting motion from either of said gears to said mandrels, means for operating said devices, a carriage for conveying said mandrels in succession past the feeding-point of the device, a plurality of cutting-tools pivotally mounted in said carriage, means for causing each of said tools to approach and recede from the axis of rotation of one of said mandrels, and means for moving said carriage.

35. In a nut-facing machine, a movable carriage, a plurality of nut-mandrels mounted on said carriage, a pair of oppositely-rotatable gears associated with each mandrel, clutches for transmitting motion from either of said gears to said mandrel, means for operating said clutches, a plurality of tools mounted on said carriage, means for causing each of said tools to approach and recede from the axis of rotation of one of said mandrels, and mechanism as each mandrel approaches the discharging-point of the machine for automatically unloading it.

36. In a nut-facing machine, a plurality of nut-mandrels, a pair of oppositely-rotatable gears associated with each mandrel, clutches for transmitting motion from either of said gears to said mandrel, a carriage for conveying said mandrels in succession past the feeding-point of the device, a plurality of facing-tools, means for causing said tools to approach and recede from said mandrels, and means as said mandrels approach the discharge-point of the machine for automatically operating said clutches to rotate said mandrels in a direction whereby they are unloaded.

37. In a device of the character described, a plurality of work-carrying agents, means for alternately reciprocating said agents, a pair of oppositely-rotatable driving members associated with each agent, means for rotating said agents from either of said driving members, a plurality of cutting-tools, and means for automatically moving said tool into and out of operative position.

38. In a device of the character described, a plurality of rotatable and reciprocable spindles, a work-mandrel carried by each spindle, a chuck for each spindle, means for holding said chucks against rotation until work to be operated on is secured to said spindle, means for alternately reciprocating said spindles, a pair of oppositely-rotatable driving members associated with each spindle, a device for each spindle for transmitting motion from either of said members to said spindle, a plurality of cutting-tools for operating on the work carried by said mandrels, and means for moving said tools into and out of operative position.

39. In a device of the character described, a plurality of rotatable and reciprocable spindles, a work-mandrel carried by each spindle, a chuck carried by each spindle, means for holding said chucks against rotation until work is secured to said spindle, means for alternately reciprocating said spindles, a pair of oppositely-rotatable driving members associated with each spindle, means for rotating said spindle from either of said driving members, a plurality of cutting-tools, means for moving said tools into and out of operative position, and means after each tool has moved from operative position for discharging the work operated on by said tool.

40. In a device of the character described, a plurality of rotatable and reciprocable spindles, means for automatically accomplishing the successive reciprocation of said spindles, a movable carrier for successively moving said spindles past the feeding-point or mouth of the device, a pair of oppositely-rotatable driving members associated with each spindle, means for rotating each spindle from either of said driving members, and a plurality of cutting-tools each movable into and out of operative position.

41. In a device of the character described, a plurality of rotatable work-carriers, a pair of oppositely-rotatable driving members associated with each work-carrier, means for successively moving said carriers past the feeding-point or mouth of the device, a plurality of tool-supporting agents movable with said work-carriers, a tool carried by each agent, and means for automatically moving each tool into and out of operative position.

42. In a device of the character described, a plurality of rotatable work-carriers, means for successively moving said carriers past the feeding-point or mouth of the device, a pair of oppositely-rotatable driving members associated with each carrier, means for rotating each of said carriers from either of said driving members, a plurality of tool-supporting agents, a tool carried by each agent, a cam for automatically moving each of said tools into and out of operative position, and means for automatically unloading each carrier as it approaches the discharge-point of the device.

43. In a device of the character described, a plurality of work-carriers, means for successively moving said carriers past the feeding-point or mouth of the device, a pair of oppositely-rotatable driving members associated with each carrier, means for rotating said carrier from either of said driving members, a plurality of tool-supporting agents movable in unison with said carriers in their travel past said mouth, and means for moving said carriers and said agents toward and away from each other.

44. In a device of the character described, a plurality of rotatable carriers, a pair of oppositely-rotatable driving members associated with each carrier, a clutch for each carrier for transmitting rotary motion from either of said members to said carrier, means for successively moving said carriers past the feeding-point or mouth of the device, a plurality of supporting agents movable in unison with said carriers in their travel past said mouth, and means for moving said carriers and said agents toward and away from each other.

45. In a device of the character described, a plurality of rotatable work-carriers, a pair of oppositely-rotatable driving members associated with each work-carrier, a clutch for each carrier for transmitting rotary motion from either of said members to said carrier, means for successively moving said carriers past the feeding-point or mouth of the device, a plurality of tool-supporting agents movable in unison with said carriers in their travel past said mouth, a tool carried by each supporting agent and automatically movable into and out of operative position, and means for automatically unloading each work-carrier as it approaches the discharge-point of the device.

46. In a device of the character described, a plurality of rotatable and successively-reciprocable spindles, a pair of oppositely-rotatable driving-gears associated with each spindle, a device for each spindle, for transmitting rotary motion from either of said driving-gears to said spindle, means for successively and continuously moving said spindles in a path in the device leading past the feeding-point or mouth thereof, and a plurality of tools each movable toward and away from the path of reciprocation of one of said spindles.

47. In a device of the character described, a plurality of rotatable and reciprocable spindles, a pair of oppositely-rotatable driving members associated with each spindle, a device for each spindle for transmitting rotary motion from either of said members to said spindle, a mandrel for each spindle, a chuck for each spindle rotatable at times with its spindle, means for successively and continuously moving said spindles in a path in the device leading past the feeding-point or mouth thereof, a plurality of tools, means for automatically moving said tools into and out of operative position, and means for unloading each of said mandrels as it approaches the discharge-point of the device.

48. In a device of the character described, a plurality of rotatable and reciprocable spindles, a screw-threaded work-mandrel for each spindle onto which the work to be operated on is adapted to be threaded, a chuck carried by each spindle, means for successively moving said spindles in a path in the device leading past the feeding-point or mouth thereof, a plurality of tools, means for automatically moving said tools into and out of operative position, and means as each spindle approaches the discharge-point of the device for locking the chuck for the approaching spindle against rotation therewith, whereby the work is unscrewed from its mandrel.

49. In a device of the character described, a continuously-moving carriage, a plurality of rotatable and successively-reciprocable work-carriers, means for rotating said work-carriers in either direction, a plurality of tool-supporting agents movable in unison with said carriage, a tool carried by each supporting agent, means for moving said tools into and out of operative position, and means for moving said carriage.

50. In a device of the character described, a continuously-movable carriage, a plurality of rotatable and successively-reciprocable work-carriers mounted in said carriage, means for rotating said work-carriers in either direction, a plurality of tool-carrying agents, a tool carried by each agent, a cam for moving said tools into and out of operative position, and means for driving said carriage.

51. In a device of the character described, a rotatable carriage, a plurality of rotatable and successively-reciprocable work-carriers mounted in said carriage, means for rotating said work-carriers in either direction, means for reversing the direction of rotation of said work-carriers once in every revolution of said carriage, a plurality of tool-supporting agents rotatable in unison with said carriage, a tool carried by each agent, and stationary means common to all of said agents for guiding said tools whereby said tools are caused to move into and out of operative position.

52. In a device of the character described, a rotatable carriage, a plurality of work-carrying agents mounted in said carriage and by it successively movable past the feeding-point or mouth of the device, means for rotating said agents in either direction, a plurality of tools movable in unison with said carriage, means for bringing the work and tools in contact, means as the work carried by each agent approaches the discharge-point of the device for moving said work and the tool which is operated on it apart, and mechanism, after said separation is effected for automatically discharging said work from the agent which carried it.

53. In a device of the character described, a plurality of rotatable, revoluble and reciprocable spindles, means for successively reciprocating said spindles, means associated with each spindle for rotating it in either direction, a plurality of cutting-tools, and means for causing said tools to approach and recede from the axes of rotation of said spindles.

54. In a device of the character described, a plurality of rotatable and reciprocable spindles, a work-mandrel carried by each spindle, a chuck for each spindle, means for holding said chucks against rotation until work to be operated on is secured thereto, means successively reciprocating said spindles, a pair of oppositely-rotatable driving members associated with each spindle, a device for each spindle for transmitting motion from either of said driving members to said spindle, a plurality of cutting-tools, and means for causing said tools to approach and recede from the axes of rotation of said spindles.

55. In a device of the character described, a plurality of rotatable and reciprocable spindles, means for automatically accomplishing the successive reciprocation of said spindles, means associated with each spindle for rotating it in either direction, a movable carrier for successively moving said spindles past the feeding-point or mouth of the device, a plurality of cutting-tools, and means for automatically causing said tools to approach and recede from the paths of reciprocation to said spindles synchronously with the movement of said carrier.

56. In a device of the character described, a plurality of rotatable and reciprocable spindles, a chuck for each spindle, means for automatically accomplishing the successive reciprocation of said spindles, a pair of oppositely-rotatable driving members associated with each spindle, a clutch for each spindle longitudinally movable thereof for transmitting motion from either of said driving members to said spindle, a movable carriage for successively moving said spindles past the feeding-point or mouth of the device, a plurality of cutting-tools movable with said spindles, means for automatically causing each of said cutting-tools to approach and recede from the path of reciprocation of one of said spindles.

57. In a device of the character described, a plurality of rotatable and reciprocable spindles, a chuck for each spindle, means for accomplishing the successive reciprocation of said spindles, a pair of oppositely-rotatable driving members associated with each spindle, means for rotating said spindles from either of said driving members, a movable carriage for successively moving said spindles past the feeding-point or mouth of the device, a plurality of cutting-tools movable with said spindles, means for automatically causing said cutting-tools to approach and recede from the paths of reciprocation of said spindles.

In testimony whereof I affix my signature in presence of two witnesses.

FRANK M. DAVIS.

Witnesses:
ANNA V. FAUST,
JNO. S. GREEN.